United States Patent [19]
Peart et al.

[11] 4,445,789
[45] May 1, 1984

[54] THERMOMETER OR OTHER INSTRUMENT ASSEMBLY

[75] Inventors: Edward L. Peart, Arden; Charlie J. Howard, Fairview, both of N.C.

[73] Assignee: Sybron Corporation, Rochester, N.Y.

[21] Appl. No.: 382,995

[22] Filed: May 28, 1982

[51] Int. Cl.³ .............................................. G01K 5/68
[52] U.S. Cl. ................................... 374/198; 374/206; 116/221; 73/431
[58] Field of Search ....................... 374/205, 206, 207; 73/431; 267/154, 155, 58; 248/477

[56] References Cited

U.S. PATENT DOCUMENTS

| | | | |
|---|---|---|---|
| 654,893 | 7/1900 | Hertshorn | 367/155 |
| 1,020,045 | 3/1912 | Merryman | 374/207 |
| 3,051,001 | 8/1962 | Laviana et al. | 374/206 |
| 3,338,103 | 8/1967 | Lohrs et al. | 73/431 |
| 3,952,598 | 4/1976 | Ferguson et al. | 73/431 |
| 4,154,110 | 5/1979 | Peart et al. | 73/431 |

Primary Examiner—Gerald Goldberg
Assistant Examiner—Hezron Williams
Attorney, Agent, or Firm—Robert A. Gerlach; Joseph C. MacKenzie

[57] ABSTRACT

The circular crystal of a temperature indicating instrument has a circular flange rotatable in a channel in the instruments' casing. Fingers on the casing have teeth which mesh with teeth on the flange. The fingers yieldably hold the crystal in place but the crystal can be forcibly rotated.

The crystal has a slotted post thereon and on said post is a bimetallic spiral coil the inner end of which is in the post's slot. Another post in the casing covers the slot to keep the coil in place on the former post.

On the back of the casing is a supporting bracket adjustable to several positions.

15 Claims, 8 Drawing Figures

THERMOMETER OR OTHER INSTRUMENT ASSEMBLY

BACKGROUND OF THE INVENTION

The manufacturer of condition responsive indicating instruments, such as thermometers having bimetallic coils for temperature sensing, reduces costs by minimizing number of parts and using plastics, while at the same time trying to assure some amount of accuracy in the operation of the instruments. Such accuracy can be provided or restored, both in the manufacturing process and in after-use, by providing for adjustment of the parts, although this in itself is not necessarily conductive to simplicity of construction or to minimizing the number of parts.

However, it is the general object of the present invention to provide a condition responsive indicating instrument of simple construction and having few parts, some of which are mutually adjustable for maintaining accuracy of indication.

Further, it is a particular object of the present invention to provide a temperature indicating instrument of the foregoing description, which uses a bimetallic spiral coil to sense temperature.

SUMMARY OF THE INVENTION

The instrument assembly of the present invention has a crystal structure mounted on case structure for rotation, like the instrument assembly described and claimed in our U.S. Pat. No. 4,154,110.

In addition, however, according to the present invention we provide the instrument assembly with adjustment means having means fixing the crystal structure in position, yet being forcibly manually releasable in order to provide for adjustment of the crystal structure by constraining it to move only in quantized or discrete increments or amounts of rotation. The instrument assembly includes a movement, in the form of a pointer rotatable by condition responsive means and a scale, along which the pointer moves to positions corresponding to the value of the condition.

Since the instrument assembly is made up essentially of two relatively rotatable structures, we incorporate the pointer and condition responsive means in one thereof, and the scale in the other thereof, and arrange these structures such that operation of the adjustment means moves the pointer relative to the scale in the same way as, but independently of, the condition responsive means. The aforesaid quantized or discrete increments or amounts of rotation are provided by digital elements on one of the said structures which yieldingly interdigitate or mesh with digital elements on the other of said structures. In partiular, these digital elements may be springily-supported gear teeth which, in response to sufficient force, disengage for providing quantized or only discrete increments of rotation.

In the case of an instrument having a pointer moved by a spiral bimetallic temperature sensing coil, or the like, we also simplify the essential instrument assembly not only by mounting the bimetallic coil on one of the said instrument assembly structures, but also by using the other structure to secure it in place. In particular, the coil is secured in place on the crystal structure by means of the said case structure.

We also provide the case structure of a thermometer with an adjustable bracket according to the invention. The bracket, which is adjustable of fixed angular positions with respect to the vertical, is in the form of a simple length of sheet metal rotatably secured by one end to the back of the case structure, with the other end being forward for attaching to a window casing. The intermediate portion of the bracket is securable to the case structure in order to fix the bracket's angular position.

DETAILED DESCRIPTION OF THE PREFERRED EMBODIMENT

Figure 1:
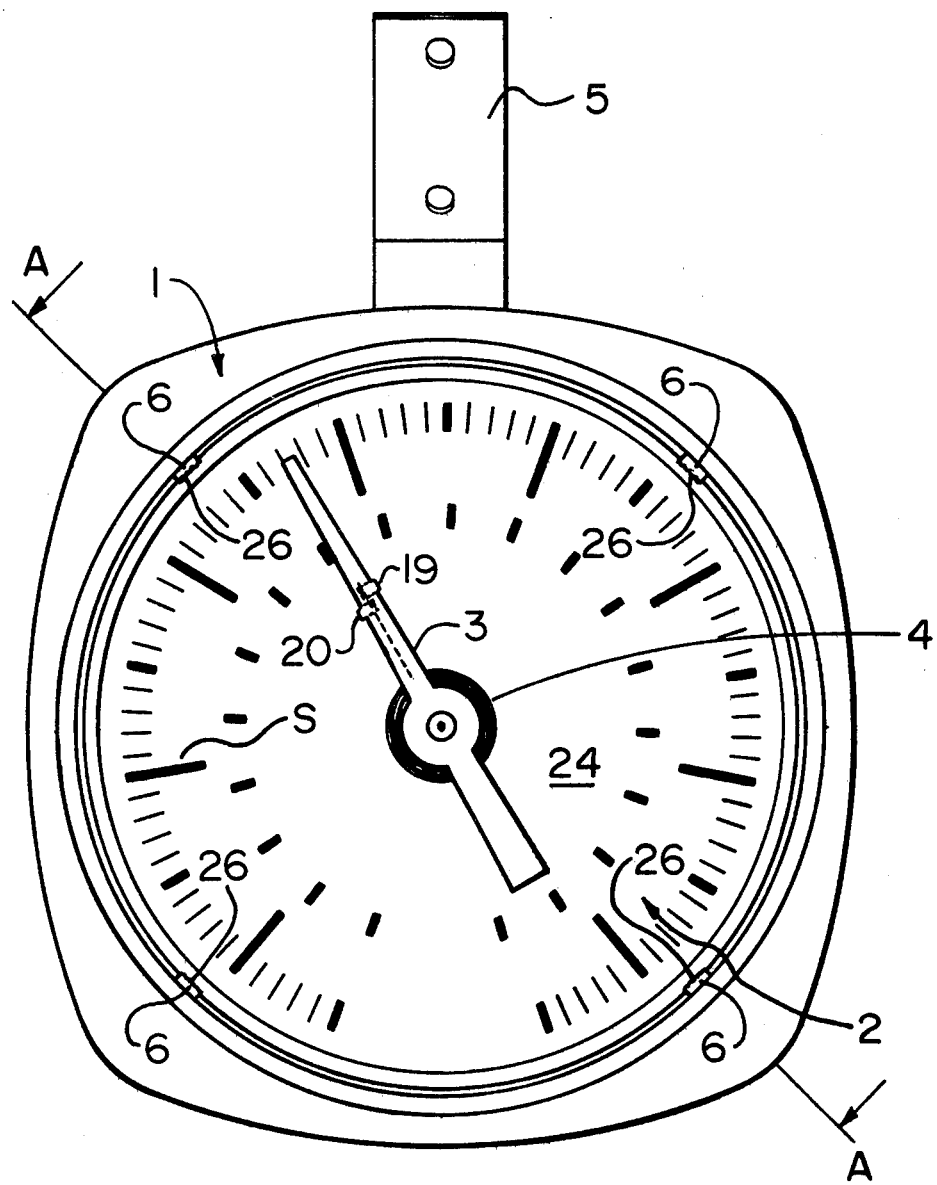
FIG. 1 is a front elevation of a thermometer according to the invention.
Figure 2:
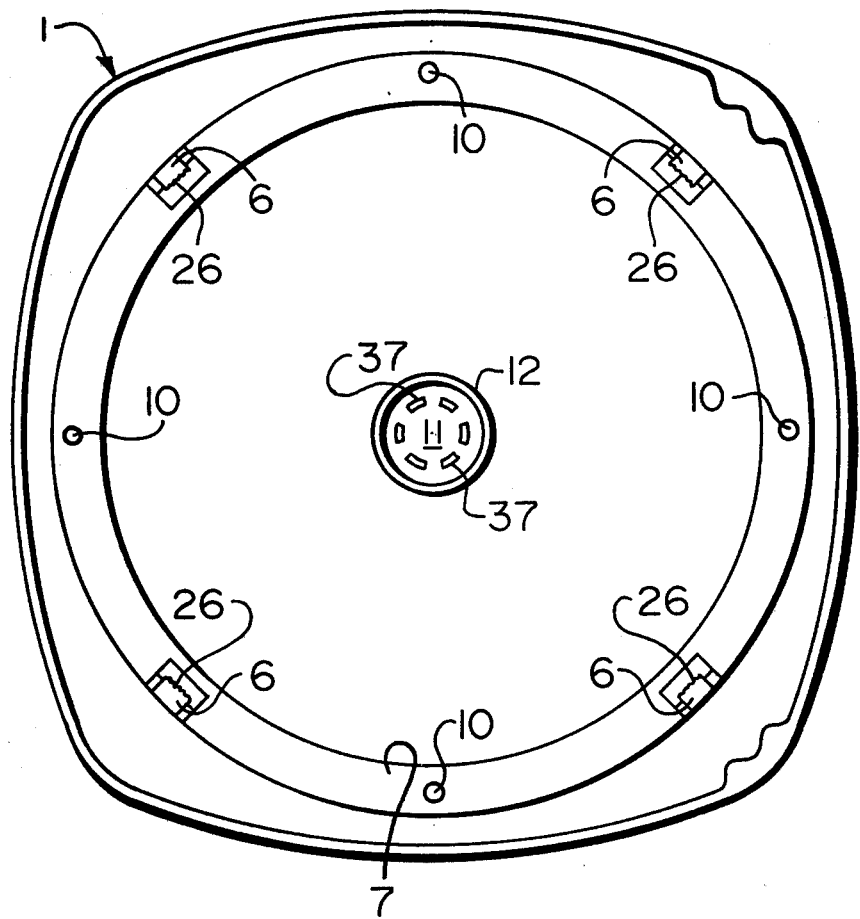
FIG. 2 is a rear elevation thereof.
Figure 3:
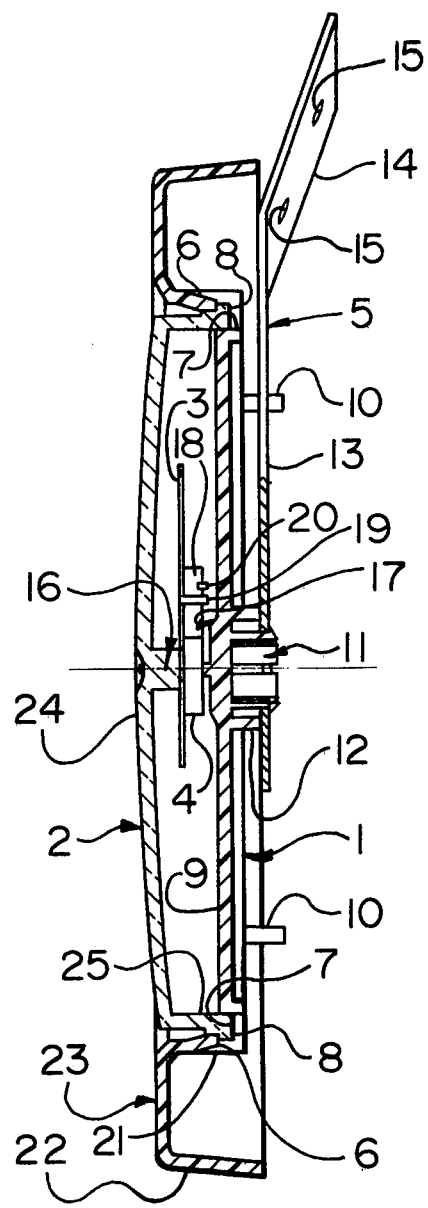
FIG. 3 is a section on the plane A—A of FIG. 1, looking in the direction of the arrows.
Figure 4:
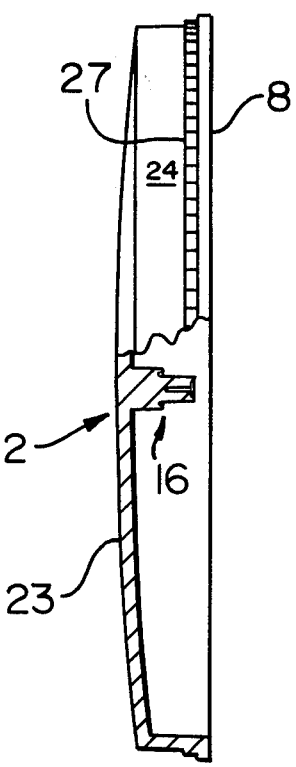
FIG. 4 is a partial section of an element of FIG. 1 on the plane A—A thereof, looking in the direction of the arrows.
Figure 5:
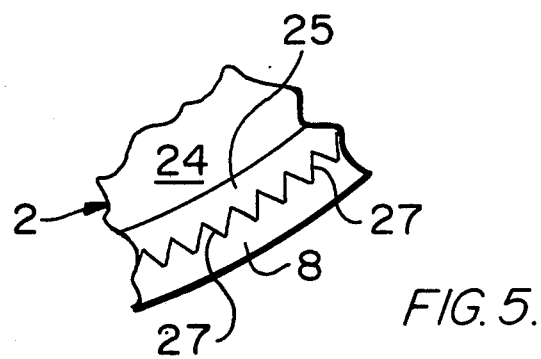
FIG. 5 is an enlarged front elevation of a portion of the element of FIG. 4.
Figure 6:
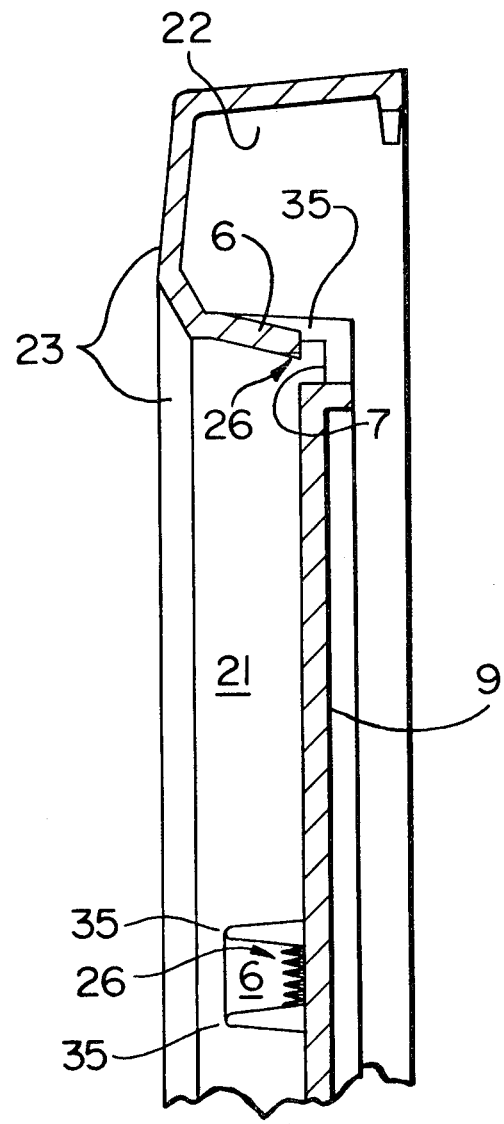
FIG. 6 is an enlarged section on the plane A—A of the upper portion of another element of FIG. 1, looking in the direction of the arrows.

As will be seen from the drawing, FIG. 1 in particular, a thermometer according to the invention consists essentially of a case 1, a crystal 2, a pointer 3, a bimetallic spiral coil 4, and a bracket 5. The case 1 has spring fingers 6, and an annular channel 7 (see FIGS. 2, 3 and 7), and the crystal 2 has a circumferential flange 8 (see FIGS. 3 and 4). Like in our U.S. Pat. No. 4,154,110, fingers 6 lock the flange into a position where it is seated in the channel 7, which is in, and on the circumference of, the bottom 9 of case 1.

From the outer surface of bottom 9 where channel 7 is formed, project cylindrical posts 10, and centrally of the outer surface of bottom 9, projects splined post 11 and flange 12 surrounding the post 11, with post 11 and flange 12 holding one arm 13 of bracket 5 in fixed angular position and to the back of the case 1, so that the other arm 14 of bracket 5, which projects at about a forty-five degree angle from arm 13 and beyond the outline of case 1, can be fixed to say, a house window casing, by such means as screws passing through holes 15 in arm 14, for reading thermometers from within a house, through a window, and outside of which the thermometer is located.

Coil 4 and pointer 3 are supported by posts 16 and 17, the former protruding from the inner surface of crystal 2, and the latter from the inside surface of bottom 9. Pointer 3 is entrained to the outer end 18 of coil 4 by means of fingers 19 and 20 which project from the sides of the pointer and more or less clasp end 18 therebetween.

The remainder of case 1 is defined by a circumferential wall 21 upstanding from the periphery of bottom 9 and defining the outer wall of channel 7, there also being an outer circumferential wall 22 surrounding the wall 21, and the two walls being joined by annular transition section 23. The case, as a whole, is shown by FIG. 1 to be squarish in outline but, of course, it could be round, oval, or otherwise shaped, in frontal appearance.

Crystal 2 has a transparent face 24, through which to observe the scale S, which may be printed on the opposing surface of bottom 9, and crystal 2 has a circumferential wall 25, surrounded by the casing wall 21 and terminated at its periphery with flange 8.

All the parts of case 1 described above, namely, fingers 6, channel 7, bottom 9. posts 10 and 11, flange 12, walls 21 and 22, and transition section 23, are formed simultaneously from a suitable plastic in a single molding operation.

Likewise, the parts of crystal 2, namely flange 8, post 16, face 24 and wall 25 are simultaneously formed of transparent plastic in a single molding operation.

In our above-identified patent, the crystal was freely rotatable in order to allow a tendency index thereon to be set at a reading of a barometric pressure indicator covered by the crystal. In the present case, we wish to be able to set pointer 3 at the place on scale S corresponding to the temperature of coil 4 which, of course, winds or unwinds, in response to change in its temperature, in amounts representing that change.

According to our invention, for the purpose of fixedly setting pointer 3 with respect to scale S. We provide each of fingers 6 with four or five identical teeth 26, and the flange 8 with 360 teeth 27 of the same size as teeth 26 and evenly distributed about the upper periphery of flange 8, at which place teeth 27 mesh with the teeth 26, when flange 8 is seated in channel 7.

The fingers 6 being springy, crystal 2 can be rotated by application of sufficient torque, applied for example by pressing the palm of the hand hard against face 24 and forcibly rotating the palm in its own plane, thus causing the teeth 26 to skip over the teeth 27 due to outward deflection of fingers 6.

The 360° angular degrees of teeth 27 will typically correspond to less than 180 Fahrenheit degrees on the scale S, so the intermesh of teeth 26 and 27 will allow one half of a degree Fahrenheit, or less, minimum adjustment, which is more than adequate for this kind of instrument. Furthermore, the teeth 26 and 27, in effect, positively fix the crystal 2 in whatever position to which it sets adjusted, because normally crystal 2 is not going to be exposed unintentionally or accidentally to torque that could be enough to rotate it with respect to scale S.

Figure 7:
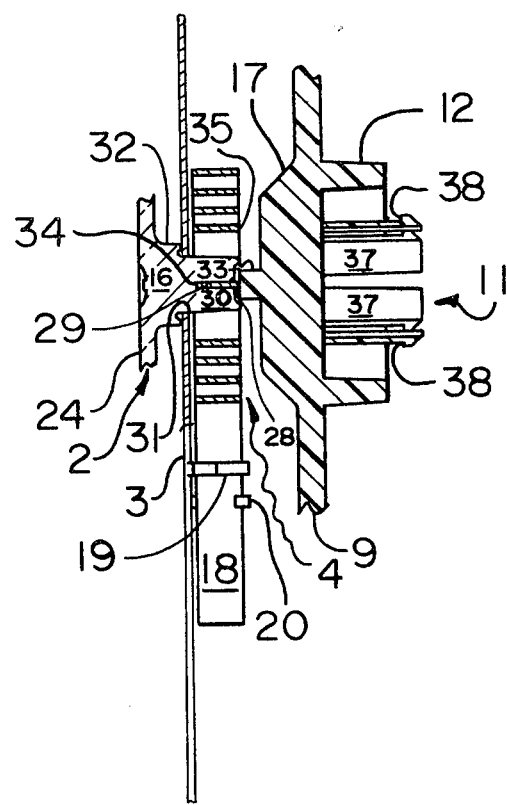
FIG. 7 is an enlarged section on the plane A—A and looking in the direction of the arrows, of other elements of FIG. 1.

In FIG. 7, the spiral bimetallic coil 4 has its inner end 28 received in a slot 29 of a reduced cylindrical portion 30 of post 16. As is well-known when so-mounted, the coil will deflect pointer 3 about an axis (not indented in the drawing) through the post, in accordance with changes in coil temperature.

The outer end 18 of coil 4 extends radially of the aforesaid axis. While outer end 18 could be used as an index of the extent of coil winding and unwinding, and therefore, of the varying temperature of the coil, we provide the separate pointer 3. A circular hole 31 in the pointer receives reduced cylindrical portion 30 of post 16, thereby constraining rotary motion of the pointer to being substantially the same as that of the coil end 18. In order to constrain motion, of the pointer to just such rotary motion, pointer 3 is provided with fingers 19 and 20 which clasp between them the end 18.

Pointer 3 is restrained from translating along post 16 by an enlargement 32 of the post, and by coil 4. Coil 4 itself is prevented from sliding out of the slot 29 and along the axis of rotation of the pointer by a stud 33 and post 17 pressing the coil end 28 against the bottom 34 of the slot 29.

In making the thermometer according to the invention, first one provides the several parts, namely, case 1, crystal 2, pointer 3 and coil 4.

Now, one assembles the pointer 3 to post 16, such that protrusion 30 of the latter projects through hole 31. There one aligns inner coil end 28 with slot 29 in post 16, and puts the inner turn 35 of coil 4 over the post, making end 28 go into the slot 29. Finally, case 1 is assembled to crystal 2 such that protrusion 33 holds coil end 18 in the slot 29 as described before.

The coil 4 being at room air temperature at this time, it is only necessary to turn crystal 2 till pointer 3 indicates on scale S a value as nearly as possible that of an accurate thermometer measuring air temperature in the near vicinity. After that, our thermometer will measure the temperature to which coil 4 is exposed, which will be that of the air surrounding the coil within the thermometer, and the exterior air surrounding the case. The temperature of the latter air affects the coil 4 partly via conduction through the material of casing 1 and crystal 2 and partly by way of convection around fingers 6.

Figure 8:
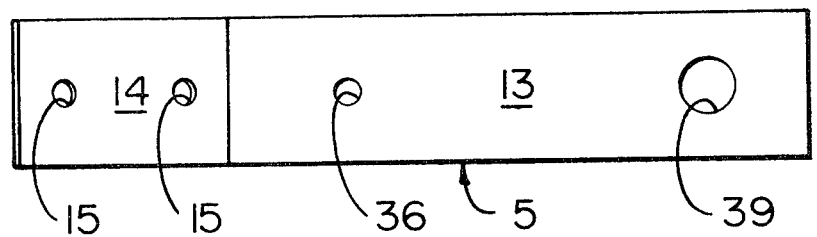
FIG. 8 is a plan view of an element of FIG. 1.

In using the thermometer with the bracket 5, one has the choice of eight different orientations. Thus, the hole 36 (FIG. 8) in bracket 5 can be positioned on any of the four posts 10 to give four different angular positions with the respect to the vertical. Again, by compressing the splines 37 (FIG. 7) of post 11 so that beaks 38 clear the circumference of hole 39 in bracket 5, the bracket 5 can be removed from post 11, flipped over, and then replaced thereon. This provides two angular orientations for each of the angular positions with respect to the vertical.

FIGS. 1 through 8 derive from drawings for manufacturing an instrument measuring 17 centimeters on its largest diameter in the view of FIG. 1. Except for some minor variations for drafting convenience, the illustrated relative proportions correspond substantially faithfully to those of the instrument as manufactured. Naturally, dimensional variations, even rearrangement or modification of parts are possible within the scope of our claims. For example, the case 1 could be constructed with the post 16, and crystal 2 with the post 17, so that it is the case which supports coil and pointer, and the crystal which is provided with scale S. Again, the outer end of coil 4 could serve as pointer. Also, spiral devices such as temperature or pressure sensing Bourdon tubes, moisture sensing spiral coils, etc., could be utilized in the manner of bimetallic temperature sensing coil 4.

Those skilled in the art will be able to devise such variations as the foregoing, which we would regard as within the scope of our invention.

We claim:

1. An instrument assembly comprising a movement, case structure, crystal structure, and adjustment means said movement comprising condition responsive means, an indicator means having pointer means and scale means, said condition responsive means being responsive to said condition for moving one of said pointer means and said scale means with respect to the other thereof along a given path such that the relative positions thereof along said path indicate values of said condition;

said pointer means and said scale means being mounted one in said case structure and one on said crystal structure, and both said pointer means and said scale means being visible through said crystal structure such that said relative positions are exteriorly visible;

said crystal structure being movably mounted in said case structure by said adjustment means, said adjustment means including means having interdigitated digital elements normally fixing said crystal structure in position, but yielding to a sufficient quantum of force manually exerted on said crystal and along said path such as to constrain said crystal to move freely for only a discrete amount corresponding to one or several of said digital elements.

2. The instrument assembly of claim 1, wherein certain of said elements are on said crystal structure and at least one thereof is on said case structure, and the former said elements and the latter said one thereof interdigitate.

3. The instrument assembly of claim 1 wherein a plurality of said elements are on said crystal structure and another plurality thereof are on said case structure and said pluralities are interdigitated with each other.

4. The instrument assembly of claim 3 wherein one of said pluralities comprises several lesser pluralities separated from each other, and the other said plurality is sufficient in number and so located as to encompass each of said lesser pluralities.

5. The instrument assembly of any one of claims 1 through 4 wherein said case structure has a circular channel and said crystal structure has a circular flange in said channel, said adjustment means including locking means over said channel, said locking means having at least one of said digital elements thereon and extending spring-biased from the case structure for interdigitating said at least one of said digital elements with digital elements on said crystal structure.

6. The instrument assembly of any one of claims 1, 3 and 4 wherein said case structure has a circular channel and said crystal structure has a circular flange in said channel, said adjustment means including locking means over said channel, said locking means having some of said digital elements thereon and extending spring-biased from the case structure for interdigitating said digital elements on said locking means with other said digital elements, the latter being on said flange.

7. The instrument assembly on any one of claims 1 through 4 wherein said condition responsive means includes a bimetallic coil having an inner end and an outer end, there being first and second posts, said first post protruding through said coil and having a slot therein receiving said inner end, whereby said coil is preventing from bodily movement except outwardly of said slot; said second post substantially closing said slot whereby to prevent said inner end from moving outwardly of slot and thereby preventing substantially all bodily movement of said inner end of said coil with respect to said first post; one said post extending from one of said structures and having said slot in the end thereof, and the other of said posts extending from the other of said structure and to said end of said one said post and closing said slot.

8. The method of assembling a bimetallic coil thermometer of the kind having crystal structure overlying other casing structure, comprising:
(a) providing one post on said crystal structure, said post extending outwardly of said crystal structure;
(b) providing another post on said casing structure, the latter said post extending outwardly of said casing structure;
(c) providing a slot in the said end of one of said posts, said slot opening outwardly of the structure from which said one of said posts extends;
(d) providing a bimetallic spiral coil around the slotted post end and providing the inner end of the spiral with a portion in and substantially fitting said slot;
(e) assembling said structure together such that slotted post end substantially meets the end of the other post at said slot.

9. The method of claim 8, wherein said coil is preformed and placed over the slotted post end and with its inner end in the slot, and thereafter the casing structure and crystal structure are brought together with said ends of said posts substantially meeting.

10. An instrument assembly comprising a condition responsive spiral coil, a first post and a second post, said condition responsive spiral coil having an inner end, and said first post and said second post being mounted coaxially of each other and substantially contacting each other at adjacent ends, one said post end having a slot opening toward the other said post end, said slot having therein the inner end of said coil, and the inner turn of said coil and said inner end thereof being so constructed that the inner end of said coil is prevented from coming out of said slot in a direction radial to the axis of said posts, while the post end adjacent said slot prevents said inner end of said coil from coming out of said slot in the direction of the last said post end.

11. The instrument assembly of claim 10, wherein said coil is made of bimetallic temperature sensitive material.

12. An instrument assembly comprising a first post, a second post, and a condition responsive spiral coil;
each post having an end extending from the instrument assembly, each said end extending toward and substantially contacting the other said end, and one said post having a slot therein, opening where said posts so contact each other;
said coil surrounding said one said post and having an inner end in said slot, said inner end being prevented from coming out of the end of said one said post by reason of the presence of the other said post;
said coil having pointer means which is deflected about said one said post by said coil in response to said condition.

13. The instrument assembly of claim 12, wherein said instrument assembly consists essentially of the structure of claim 12 in combination with a crystal structure providing one said post, and a casing structure providing the other said post.

14. A window thermometer having a bracket having an end rotatably secured to said thermometer, and another end provided with securing means for securing said bracket to a window casing;
said bracket being provided with an intermediate portion, said intermediate portion connecting said ends and being releasably engageable with bracket angular-position defining means on said thermometer, and there being a plurality of the last said means spaced about the path of rotation of said bracket.

15. The window thermometer of claim 14, wherein said bracket angular-position defining means are posts protruding from said thermometer, and said intermediate portion having at least one hole located for receiving at least one of said posts.

* * * * *

UNITED STATES PATENT AND TRADEMARK OFFICE
CERTIFICATE OF CORRECTION

PATENT NO.  : B1 4,445,789
DATED       : October 22, 1985
INVENTOR(S) : Edward L. Peart and Charlie J. Howard It is certified that error appears in the above-identified patent and that said Letters Patent are hereby corrected as shown below:

Claim 14, line 3: delete "another".

Claim 14, line 6: insert "," after the word "ends" and correct spelling of "annular" to --angular--.

Signed and Sealed this

Twelfth Day of August 1986

[SEAL]

Attest:

DONALD J. QUIGG

Attesting Officer

Commissioner of Patents and Trademarks

REEXAMINATION CERTIFICATE (409th)

United States Patent [19]

Peart et al.

[11] B1 4,445,789
[45] Certificate Issued   Oct. 22, 1985

[54] THERMOMETER OF OTHER INSTRUMENT ASSEMBLY

[75] Inventors: Edward L. Peart, Arden; Charlie J. Howard, Fairview, both of N.C.

[73] Assignee: Sybron Corporation, Rochester, N.Y.

Reexamination Request:
No. 90/000,680, Dec. 4, 1984

Reexamination Certificate for:
Patent No.: 4,445,789
Issued: May 1, 1984
Appl. No.: 382,995
Filed: May 28, 1982

[51] Int. Cl.[4] .................... G01K 5/68; A47G 35/00
[52] U.S. Cl. ..................... 374/198; 374/206; 116/221; 73/431; 29/453; 248/477
[58] Field of Search ............... 29/453; 248/477, 291, 248/294, DIG. 4; 374/118, 206, 208; 116/221; 73/431, 144, 387, 432 A; 368/296, 185, 294; 403/354; 236/101 D; 60/529; 428/616

[56] References Cited

U.S. PATENT DOCUMENTS

| | | | |
|---|---|---|---|
| 2,117,012 | 5/1938 | Whittier | 374/208 X |
| 2,488,057 | 11/1949 | Ensign et al. | 368/294 X |
| 2,852,742 | 9/1958 | Bakke et al. | 116/291 X |
| 2,964,947 | 12/1960 | De Jong | 29/434 X |
| 3,020,702 | 2/1962 | Feldman | 368/294 X |
| 3,505,515 | 4/1970 | Adra | 248/291 X |
| 3,982,771 | 9/1976 | Tropeano | 248/477 X |
| 4,144,832 | 3/1979 | Dahl | 248/291 X |
| 4,244,044 | 1/1981 | Olsson | 368/294 X |

OTHER PUBLICATIONS

Article entitled "Snap-fingers provide, quick, easy assembly", published in Plastics World magazine, Oct. 1977, issue, p. 41.
Article—"Instructions To Mount Thermometer" of The Plastics World Article (Oct. 1977).

*Primary Examiner*—Daniel M. Yasich

[57] ABSTRACT

The circular crystal of a temperature indicating instrument has a circular flange rotatable in a channel in the instruments' casing. Fingers on the casing have teeth which mesh with teeth on the flange. The fingers yieldably hold the crystal in place but the crystal can be forcibly rotated.

The crystal has a slotted post thereon and on said post is a bimetallic spiral coil the inner end of which is in the post's slot. Another post in the casing covers the slot to keep the coil in place on the former post.

On the back of the casing is a supporting bracket adjustable to several positions.

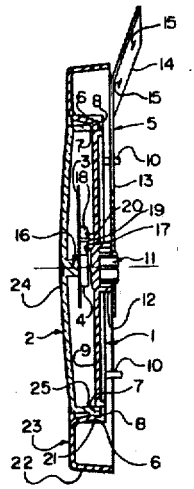

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7 is confirmed.

Claims 13 and 15 are cancelled.

Claims 8, 10, 12, and 14 are determined to be patentable as amended.

Claims 9 and 11, dependent on an amended claim, are determined to be patentable.

8. The method of assembling a bimetallic coil thermometer of the kind having *a* crystal structure overlying [other] *a* casing structure, comprising:
  (a) providing *a first* [one] post on said crystal structure, said *first* post extending outwardly of said crystal structure *terminating in a first end;*
  (b) providing *a second* [another] post on said casing structure, [the latter] said *second* post extending outwardly of said casing structure *terminating in a second end portion;*
  (c) providing a slot in [the] said *first end portion or second* end [of one of said posts] *portion*, said slot opening outwardly [of the structure] from *said crystal structure or casing structure from* which said [one of said] post extends;
  (d) providing a bimetallic spiral coil *having an inner end* around the slotted post end *portion* [and providing the] *such that said* inner end of [the] *said* spiral *coil* [with a portion in and] substantially [fitting] *fits in* said slot;
  (e) assembling said *crystal* structure *and said casing structure* together such that *said* slotted post end substantially meets the end *portion* of the other post at said slot.

10. An instrument assembly comprising a condition responsive spiral coil, *a crystal structure having* a first post, *said first post having a free end and a casing structure having a* second post, *said second post having a free end,* said condition responsive spiral coil having an inner end, [and] said first post and said second post being mounted coaxially of each other *such that said free end of said first and second posts* [and] *are* substantially contacting each other [at adjacent ends], *said free end of said first or second* [one] said post [end] having a slot opening *therein opening outward of said free end and extending* toward the other *first or second* said post *free* end, said slot having therein the inner end of said coil, and the inner [turn] *end* of said coil [and said inner end thereof being so constructed] *having a configuration such that the inner end of said coil is prevented from coming out of said slot in a direction radial to the axis of said posts when said free ends of said posts substantially contact each other* [, while the post end adjacent said slot prevents said inner end of said coil from coming out of said slot in the direction of the last said post end].

12. An instrument assembly comprising *crystal structure having* a first post, *a casing structure having a* second post, and a condition responsive spiral coil;
  [each post having an end extending from the instrument assembly, each said end extending toward and substantially contacting the other said end, and one said post having a slot therein, opening where said posts so contact each other;
  said coil surrounding said one said post and having an inner end in said slot, said inner end being prevented from coming out of the end of said one said post by reason of the presence of the other said post;]
  *said first and second posts having a first and second end, respectively, extending outwardly from the instrument assembly, said ends extending toward and substantially contacting each other when the crystal and casing are assembled, and one of said posts having a slot in its respective end, said slot opening toward the other said post;*
  *said coil surrounding said post which has said slot in its respective said end, said coil having an inner end placed in said slot, said inner end being prevented from coming out of said slot by the presence of the end of said other post;*
  *the other end of* said coil having *a* pointer means which is deflected about [said] one *of* said posts by said coil in response to condition.

14. A window thermometer having a bracket, *said bracket* having [an] *a first* end rotatably secured to said thermometer, and another *a second* end provided with securing means for securing said bracket to a window casing, *and an intermediate portion connecting said first and second ends a plurality of annular position means spaced about the path of rotation of said bracket;*
  said bracket [being provided with an intermediate portion, said intermediate portion connecting said ends and] being releasably engageable with *said* [bracket] angular-position [defining] means [on said thermometer, and there being a plurality of the last said means spaced about the path of rotation of], *said bracket angular-position means are a plurality of spaced posts protruding from a portion of said thermometer, and said intermediate portion having at least one hole located for selectively receiving one of said posts.*

* * * * *